United States Patent
Boudouris

[15] 3,651,441
[45] Mar. 21, 1972

[54] ELECTRICAL JUNCTION BOX

[72] Inventor: Angelo Boudouris, Sylvania, Ohio
[73] Assignee: Eprad Incorporated, Toledo, Ohio
[22] Filed: Dec. 1, 1969
[21] Appl. No.: 881,073

[52] U.S. Cl. ............................337/186, 174/52, 337/201
[51] Int. Cl. ..........................................................H01h 85/50
[58] Field of Search............337/186, 187, 188, 194, 197, 337/199, 201, 211, 213, 269, 189, 195, 196; 174/52; 339/14, 198 G, 198 H, 198 J, 198 S, 198 P

[56] References Cited

UNITED STATES PATENTS

| | | | |
|---|---|---|---|
| 3,243,551 | 3/1966 | Hollins | 337/195 |
| 3,116,386 | 12/1963 | Sperzel | 337/188 |
| 2,808,485 | 10/1957 | Cardone | 337/201 X |
| 2,638,520 | 5/1953 | Ward | 337/195 |
| 2,528,971 | 11/1950 | Philips | 337/269 X |
| 3,417,359 | 12/1968 | Urani | 337/201 |
| 3,299,236 | 1/1967 | Barker | 337/189 |
| 2,417,692 | 3/1947 | Kline | 337/201 X |
| 1,930,428 | 10/1933 | Jackson et al | 337/201 X |
| 1,813,582 | 7/1931 | Mason | 337/199 X |

Primary Examiner—Bernard A. Gilheany
Assistant Examiner—Dewitt M. Morgan
Attorney—Allen D. Gutchess, Jr.

[57] ABSTRACT

An electrical junction box includes a base and a cover, with the cover having fuses mounted thereon and extending outwardly therefrom. An electrical device such as a portable electric heater for a drive-in theater has conductors extending into the cover and electrically connected to ends of the fuses held thereby. The base has recesses to receive the opposite ends of the fuses, when the cover and base are assembled, with supply lines supplying power to the fuses through electrical contacts in the recesses. When the cover is removed, the circuit is broken between the fuses and the supply lines in the base, thereby disconnecting the electrical device associated with the cover for safety. The base and cover preferably are made of fiberglass-reinforced plastic or similar insulating material for shock-resistance and durability.

6 Claims, 5 Drawing Figures

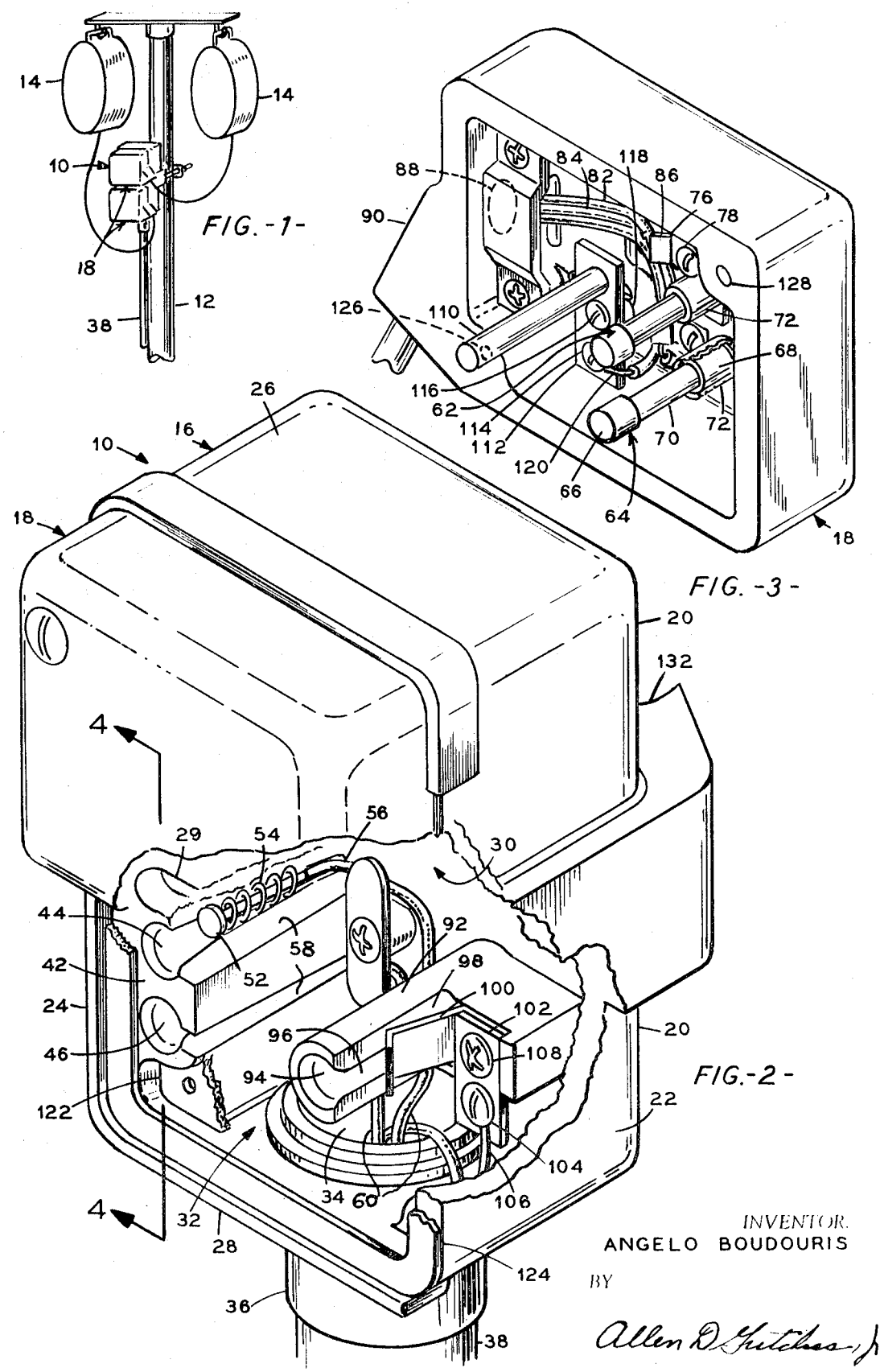

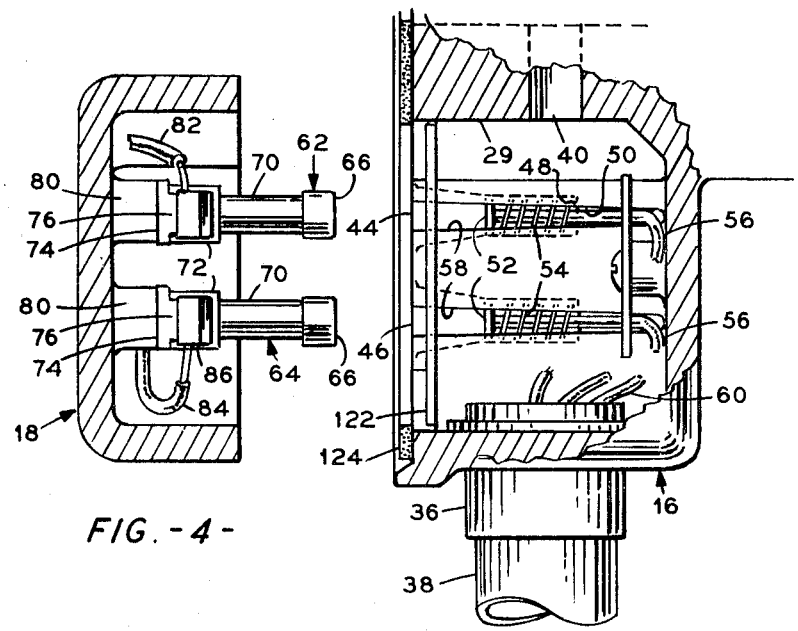
FIG.-4-
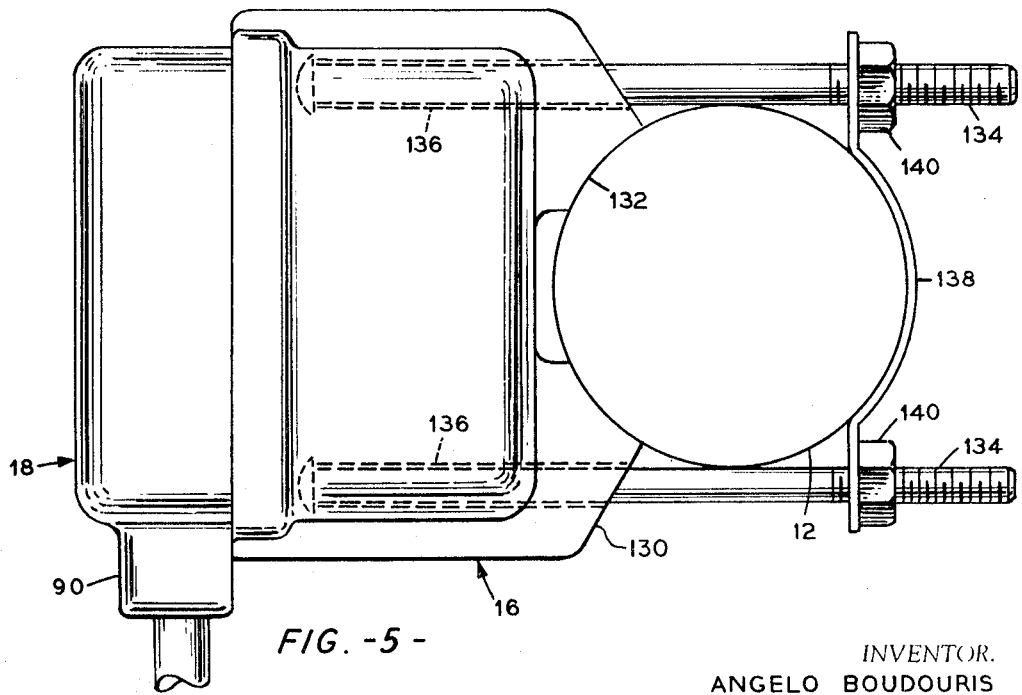
FIG.-5-
INVENTOR.
ANGELO BOUDOURIS

ELECTRICAL JUNCTION BOX

This invention relates to an electrical junction box and more particularly to such a box having fuses mounted in the cover and arranged to be disconnected from supply lines in the base when the cover is removed.

The junction box according to the invention employs elongate or cartridge-type fuses held by the cover in electrically conducting receptacles or sockets to which lines are connected from an external electrical device to receive power. The fuses are positioned so as to be received in recesses or receptacles in the base when the cover is assembled with the base. Spring-loaded contacts are located in the bottoms of the recesses and provide electrical contact with the fuses when assembled therewith. Supply lines extend into the base and are electrically connected to the spring-loaded contacts. A grounding prong or member is also affixed to the cover and extends outwardly parallel to the cartridge fuses. It, too, is received in a receptacle of the base and connects to a ground terminal when the cover and base are assembled. Even when the cover is dis-assembled, all hot conductors are recessed so as not to be accidentally contacted by a repairman. Also, if desired, the electrical device and the cover wired therewith can both be removed and replaced as an assembly by another device and cover so that the first device can be taken to a remote point to facilitate repair.

The entire box and cover are of insulating material to provide further safety from possible shock and provide utmost durability and weather-resistance.

It is, therefore, a principal object of the invention to provide an electrical junction box having the advantages discussed above.

Many other objects and advantages of the invention will be apparent from the following detailed description of a preferred embodiment thereof, reference being made to the accompanying drawings, in which:

FIG. 1 is a somewhat schematic view in perspective of a junction box embodying the invention, shown mounted on a post carrying a pair of portable heaters for a drive-in theater;

FIG. 2 is an enlarged view in perspective of the junction box of FIG. 1, with one cover removed and with parts broken away;

FIG. 3 is a view in perspective, with parts broken away, of the inside of a cover for the junction box of FIG. 2;

FIG. 4 is a vertical view in cross section taken along the line 4—4 of FIG. 2 and further showing a cover ready to be assembled with the base; and FIG. 5 is a horizontal sectional view showing the provisions for mounting the junction box on the post.

Referring to FIG. 1, a junction box according to the invention is indicated at 10 and is shown mounted on a post 12 with a pair of portable heaters 14 removably supported at the top of the post. The post is intended to be located between two automobiles at a drive-in theater with the heaters accessible for placement in the patrons' automobiles for warmth. The junction box 10 has numerous applications, of course, in addition to the one illustrated.

Referring more particularly to FIG. 2, the junction box 10 basically includes a base 16 and a cover 18. The base and the cover are of heavy, glass fiber reinforced plastic construction or the like so as to be electrically insulated for safety purposes. This type of construction is also extremely durable and weather resistant. As shown, the base 16 includes a back wall 20, side walls 22 and 24, an upper wall 26, and a lower wall 28. A central, horizontal partition 29 divides the base 16 into an upper compartment indicated at 30 and a lower compartment indicated at 32. These are substantially identical, each adapted to receive one of the covers 18, and only one will be discussed in detail.

A central opening 34 in the bottom wall 28 receives an electrical connector 36 for a main supply line 38 which is connected to a suitable source of power. When the junction box 10 is used with heaters, as shown in FIG. 1, the supply line 38 can extend downwardly along the post 12 and be buried. Conductors of the supply line 38 also can be extended through an opening 40 in the partition 29 to supply power to the upper compartment 30.

A thick portion 42 of the side wall 24 contains two generally cylindrical recesses or receptacles 44 and 46 which extend down to end walls 48 (FIG. 4) having notches 50. In the bottom of each of the receptacles 44 and 46 is a metal contact 52 soldered or otherwise suitably affixed to the upper end of a coil spring 54 seated on the end wall 48. An electrical wire 56 is suitably affixed as by soldering to each of the contacts 52 with the wire extending through the coil spring 54 and out the notch 50. Slots 58 extend lengthwise of the receptacles 44 and 46 to facilitate installation of the wires, contacts, and springs in the receptacles. Each of the wires 56 is then connected to one of live or hot conductors 60, which are part of the supply line 38, by wire nuts (not shown) or other suitable connectors. Of course, in instances in which the device with which the junction box is used requires only 110-volt current or other current requiring only one hot line, only one of the receptacles 44 and 46 may be employed.

Two cartridge fuses 62 and 64 (FIGS. 3 and 4) of the ferrule type, are mounted on the cover 18 and extend in a direction parallel to the direction in which the cover is mounted on the base so that when the base and cover are assembled, the cartridge fuses 62 and 64 are received in the receptacles 44 and 46. The fuses 62 and 64 are of conventional design with conducting end caps 66 and 68 connected by a thin conductor or fuse wire (not shown) in a body 70. The outer ends 66 of the fuses 62 and 64 engage the contacts 52 in the bottom of the receptacles 44 and 46 and compress the springs 54 for good electrical contact when the cover is affixed to the base. The opposite end caps 68 of the fuses are frictionally held in conducting sockets or cups 72. The sockets 72 are mounted on terminal plates 74 forming terminal ears 76 with screws or other suitable fasteners 78 between the ears 76 and the cups 72 to affix the assembly to bosses 80 or the like on the inside of the cover. A pair of wires 82 and 84 are connected by clips 86 to the ears 76 and extend out of the cover through a diagonal side passage 88 formed in an enlarged side portion 90 of the cover 18. These wires are then connected to the external electrical device.

For grounding purposes, a central projection 92 in the compartment 32 forms a receptacle 94 having an open slot 96 at one side in a flat portion 98 of the projection 92. An ear 100 engages the surface 98 and extends upwardly from a terminal plate 102 having a terminal screw 104 to which a ground wire 106 is electrically connected. A screw 108 affixes the terminal plate 102 to a portion of the back wall 20 of the base.

A ground projection or member 110 extends from the cover 18 in the same direction as the fuses 62 and 64, to be received in the receptacle 94, which is also positioned parallelly to the receptacles 44 and 46. The ground projection 110 is affixed to a terminal plate 112 having a terminal screw 114 and a mounting screw 116 which affixes the plate 112 to a boss 118 inside the cover. A ground conductor 120 is connected to the screw 114 and extends through the passage 88 to the electrical device.

Insulating plates 122 are mounted above each of the compartments 30 and 32 and a gasket 124 for waterproofing purposes is located around the outer walls of the base. The covers are affixed to the base by screws extending through passages 126 and 128 at two diagonally opposite corners of the cover. These screws are turned into suitable recesses in the base and hold the insulating plate therebetween, with the gasket 124 being compressed between the cover and the base.

From the above, it will be apparent that when the cover is assembled with the base, the fuses 62 and 64 extend into the receptacles 44 and 46 with the ends 66 engaged with the resiliently mounted contacts 52. Circuits are thereby completed between the wires 56, the contacts 52, the fuses 62 and 64, the mounting cups 72, and the wires 82.

At the same time, a ground path is completed between the wire 106, the ear 100, the ground projection 110, the terminal plate 112, and the wire 120.

Whenever it is desired to repair or otherwise disconnect the external electrical device, such as the heater 14, the two screws of the associated cover 18 are removed and the cover pulled outwardly, thereby disconnecting the fuses 62 and 64 and the ground projection 110 to remove all power from the electrical device. The ground projection 110 is preferably slightly longer than the fuses 62 and 64 so that a ground path will remain in the event the cover is only partially removed.

When the junction box 10 is to be mounted on a post such as the post 12, the rear of the back wall 20 can be molded with a U-shaped portion 130 (FIG. 5) with an arcuate surface 132 having a radius substantially equal to the radius of the post. A pair of bolts 134 extend through passages 136 in side portions of the base 16 and are connected to a U-shaped strap 138, on the opposite side of the post 12, by nuts 140.

Various modifications of the above described embodiment of the invention will be apparent to those skilled in the art and it is to be understood that such modifications can be made without departing from the scope of the invention, the embodiment shown and described being primarily for purposes of illustration and not limitation.

I claim:

1. A junction box comprising a base having a back wall, side walls, and two end walls constructed of thick insulating material with a partition extending between the side walls to divide the junction box into two compartments, a cover for closing each of said compartments, means for affixing each of said covers to said base, each of said covers having means for receiving a portion of a first fuse, each of said covers also having means for receiving a portion of a second fuse to be positioned parallelly to the first fuse, each of said covers also having an opening through which an electrical conductor can extend to connect said fuse-receiving means to an external electrical device, each of said compartments of said base having a first recess to receive another portion of the first fuse and a second recess to receive another portion of the second fuse, whereby said recesses and said fuse-receiving means are adapted to be electrically connected by the fuses when the associated cover and said base are assembled, and means associated with said base for connecting electrical conductors from a power supply to the recesses.

2. A junction box according to claim 1 characterized by an elongate conducting ground member carried by each of said covers, said base having means in each of said compartments to receive the ground member when the associated cover and said base are assembled.

3. A junction box according to claim 1 characterized by the back wall of said base having an arcuate surface formed thereon with a radius equal to a radius on which the junction box is to be mounted, a pair of bolts extending rearwardly from said base near each end of the arcuate surface, and strap means affixed to said bolts for holding the box on a post.

4. A junction box according to claim 1 characterized by one of said end walls having an opening therein, an electrical connection mounted in said opening to receive a power supply line, and said partition having an opening between said compartments to enable power lines to be extended through the compartment adjacent the end wall opening and into the other compartment.

5. A weather-resistant junction box comprising a base having a back wall, side walls, an upper wall and a lower wall constructed of insulating material and a partition extending between the side walls to divide the junction box into two compartments, a cover for closing each of said compartments, gasket means, means for affixing said covers to said base with said gasket means therebetween, each of said covers having means for receiving an end portion of a first fuse, each of said covers also having means for receiving an end portion of a second fuse, each of said covers also having an opening, first electrical conductors extending through said openings for external electrical devices, means associated with each of said covers for connecting the respective conductors to said fuse-receiving means, each of said compartments of said base having recesses to receive other end portions of the first and second fuses whereby said fuse-receiving means and said recesses are adapted to be electrically connected by the fuses when said covers and said base are assembled, said base having an opening, second electrical conductors extending through said base opening from a power supply, and means associated with said base for connecting said second electrical conductors to said recesses of each of said compartments.

6. A weather-resistant junction box according to claim 5 characterized further by an elongate conducting member held by said cover and adapted to extend in the same direction to receive and be electrically connected to said elongate conducting member, a third conductor extending through said cover opening from the external electrical device, means associated with said cover for connecting said third conductor to said elongate conducting member, a ground electrical conductor extending through said base opening, and means associated with said base for connecting said ground electrical conductor with said elongate conducting member-receiving means of said base.

\* \* \* \* \*